(12) United States Patent
Dupouy

(10) Patent No.: US 10,758,930 B2
(45) Date of Patent: Sep. 1, 2020

(54) FLUID APPLICATION DEVICE FOR A MECHANICAL FASTENER

(71) Applicant: KUKA Systems Aerospace, Le Haillan (FR)

(72) Inventor: Eric Dupouy, Merignac (FR)

(73) Assignee: KUKA Systems Aerospace, Le Haillan (FR)

( * ) Notice: Subject to any disclaimer, the term of this patent is extended or adjusted under 35 U.S.C. 154(b) by 425 days.

(21) Appl. No.: 15/535,885

(22) PCT Filed: Dec. 17, 2015

(86) PCT No.: PCT/EP2015/080261
§ 371 (c)(1),
(2) Date: Jun. 14, 2017

(87) PCT Pub. No.: WO2016/102307
PCT Pub. Date: Jun. 30, 2016

(65) Prior Publication Data
US 2018/0354021 A1 Dec. 13, 2018

(30) Foreign Application Priority Data
Dec. 22, 2014 (EP) ..................... 14307140

(51) Int. Cl.
*B05C 1/06* (2006.01)
*B05C 1/02* (2006.01)
(Continued)

(52) U.S. Cl.
CPC .................. *B05C 1/06* (2013.01); *A46B 7/04* (2013.01); *B05C 1/02* (2013.01); *B05C 13/025* (2013.01);
(Continued)

(58) Field of Classification Search
CPC .. B05C 13/02; B05C 3/09; B05C 1/06; B05C 13/025; B25J 11/0075; B05D 1/002; A46B 7/04; F16N 7/12
See application file for complete search history.

(56) References Cited

U.S. PATENT DOCUMENTS 4,144,625 A * 3/1979 Hogenhout ............... B05C 7/00
118/215
4,223,632 A * 9/1980 Cadwallader .......... B05C 19/04
118/112
(Continued)

FOREIGN PATENT DOCUMENTS

| CN | 2887487 Y | 4/2007 |
|---|---|---|
| CN | 201664651 U | 12/2010 |

(Continued)

OTHER PUBLICATIONS

Chinese Patent Office; Office Action in related Chinese Patent Application No. 201580069956.X dated Nov. 26, 2018; 3 pages.
(Continued)

*Primary Examiner* — Karl Kurple
(74) *Attorney, Agent, or Firm* — Dorton & Willis, LLP

(57) ABSTRACT

A fluid application device for mechanical fasteners such as rivets, screws, bolts, and similar fasteners, and a robot end effector including such a device as well as a robot being equipped therewith. The fluid application device includes a fluid application element having a curved application surface, wherein the curved application surface includes a channel configured to receive a fluid. A brush is arranged at the curved application surface such that the fluid is able to wet the brush elements. The device further includes a gripping device configured to push a mechanical fastener against the wetted brush elements.

15 Claims, 4 Drawing Sheets

(51) Int. Cl.
    *B25J 11/00*    (2006.01)
    *A46B 7/04*    (2006.01)
    *B05C 13/02*    (2006.01)
    *B21J 15/14*    (2006.01)
    *F16N 7/12*    (2006.01)
    *B05D 1/28*    (2006.01)
    *B05C 9/08*    (2006.01)

(52) U.S. Cl.
    CPC ........... *B21J 15/142* (2013.01); *B25J 11/007* (2013.01); *B25J 11/0075* (2013.01); *F16N 7/12* (2013.01); *B05C 9/08* (2013.01); *B05C 13/02* (2013.01); *B05D 1/28* (2013.01); *B05D 2258/02* (2013.01)

(56) References Cited

U.S. PATENT DOCUMENTS

| | | | | |
|---|---|---|---|---|
| 4,428,981 | A * | 1/1984 | Wallace | B05D 1/06 118/308 |
| 4,457,260 | A * | 7/1984 | Johnson | B05C 5/0208 118/410 |
| 4,508,759 | A * | 4/1985 | Wallace | B05D 1/06 118/308 |
| 4,519,974 | A * | 5/1985 | Bravenec | B29C 39/10 249/117 |
| 5,087,484 | A * | 2/1992 | Stewart | B05C 5/0208 427/230 |
| 5,520,737 | A * | 5/1996 | Denton | B05C 3/09 118/400 |
| 5,647,111 | A | 7/1997 | Zienkiewicz et al. | |
| 6,103,011 | A * | 8/2000 | Riera | B05C 1/027 118/264 |
| 6,550,547 | B1 * | 4/2003 | Payne | E21B 19/15 175/24 |
| 6,589,343 | B1 * | 7/2003 | Egeland | E21B 17/006 118/315 |
| 8,915,355 | B2 * | 12/2014 | Monson | A46B 11/001 206/15.3 |
| 9,061,313 | B1 * | 6/2015 | Williams | B05C 1/02 |
| 10,052,656 | B2 * | 8/2018 | Maslennikov | B05D 1/28 |
| 2004/0124235 | A1 * | 7/2004 | White | B65B 51/067 229/125.34 |
| 2005/0049126 | A1 | 3/2005 | Everson et al. | |
| 2005/0066890 | A1 * | 3/2005 | Wetzel | B05B 13/0452 118/313 |
| 2008/0057210 | A1 * | 3/2008 | Snow | B05B 13/0221 427/429 |
| 2008/0121174 | A1 * | 5/2008 | Halse | E21B 17/006 118/300 |
| 2008/0223418 | A1 * | 9/2008 | Vatne | E21B 17/006 134/99.1 |
| 2008/0302300 | A1 * | 12/2008 | Lee | |
| 2009/0202727 | A1 * | 8/2009 | Abas | B05C 1/006 427/284 |
| 2009/0217868 | A1 * | 9/2009 | Caseteuble | B05C 17/00503 118/300 |
| 2010/0178429 | A1 * | 7/2010 | Presley | B05C 17/014 427/430.1 |
| 2012/0034376 | A1 * | 2/2012 | Nakamura | B05B 13/0442 427/233 |
| 2012/0199289 | A1 * | 8/2012 | Oda | B25J 9/0084 156/351 |
| 2013/0075283 | A1 * | 3/2013 | Monson | A46B 11/001 206/216 |
| 2014/0110173 | A1 * | 4/2014 | Belik | E21B 17/006 175/52 |
| 2015/0064357 | A1 * | 3/2015 | Tomuta | A46B 11/063 427/429 |
| 2015/0086718 | A1 * | 3/2015 | Magnuson | B05B 9/0409 427/256 |
| 2015/0296969 | A1 | 10/2015 | Sakasegawa et al. | |
| 2016/0325088 | A1 * | 11/2016 | Nordquist | A61M 39/16 |
| 2016/0332189 | A1 * | 11/2016 | Clark | B05D 1/00 |
| 2017/0036233 | A1 * | 2/2017 | Maslennikov | B05D 1/28 |
| 2018/0029061 | A1 * | 2/2018 | Hayama | B05B 15/70 |

FOREIGN PATENT DOCUMENTS

| | | |
|---|---|---|
| CN | 102671832 A | 9/2012 |
| DE | 4320282 A1 | 12/1994 |
| DE | 202008014886 U1 | 4/2010 |
| JP | 2014091078 A | 5/2014 |
| WO | 2014069419 A1 | 5/2014 |

OTHER PUBLICATIONS

Chinese Patent Office; Search Report in related Chinese Patent Application No. 201580069956.X dated Nov. 16, 2018; 2 pages.
European Patent Office; Search Report in European Patent Application No. 14 30 7140 dated May 28, 2015; 2 pages.
European Patent Office; Search Report and Written Opinion in International Patent Application No. PCT/EP2015/080261 dated Feb. 26, 2016; 10 pages.

* cited by examiner

FLUID APPLICATION DEVICE FOR A MECHANICAL FASTENER

CROSS-REFERENCE

This application is a national phase application under 35 U.S.C. § 371 of International Patent Application No. PCT/EP2015/080261, filed Dec. 17, 2015, which claims the benefit of European Patent Application No. 14307140.5 filed Dec. 22, 2014, the disclosures of which are incorporated by reference herein in their entirety.

TECHNICAL FIELD

The present invention relates to a fluid application device for mechanical fasteners, such as rivets, screws, bolts and similar.

BACKGROUND

In many industrial manufacturing processes, mechanical fasteners, such as rivets, screws, bolts and similar are used to connect or affix two or more objects together. The installation of such mechanical fasteners is often automated by machines or robots that can install mechanical fasteners much quicker and with a higher precision than a human being.

In some applications, such as aircraft construction, it is necessary to provide the fasteners with a sealant prior to installation. Such a sealant avoids the leakage of air or water through the holes in which the fasteners are installed. It is desirable to apply the sealant to the fasteners immediately before installation to avoid premature curing of the sealant as well as to avoid a contamination of the machine or robot with the sealant while handling the fasteners.

Furthermore, it is desirable that the sealant is applied reliably and in a constant and predictable amount to avoid insufficiently sealed junctures on the one hand and to avoid excess sealant around the juncture on the other hand. This aspect is in particular important in aircraft construction, where leakages may have severe effects, but where excess sealant impairs aerodynamic properties.

From prior art document DE 20 2008 014886 U1 a robot effector is known for installing mechanical fasteners, in particular rivets. In one embodiment the mechanical fasteners are two-piece rivets having a shaft and a complementary hollow counterpart. The shaft may comprise an area for receiving a sealant which may seal an opening in a workpiece if the rivet is installed and may also glue the rivet.

SUMMARY

In view of the above, it is an object of the present invention to provide a fluid application device for mechanical fasteners, such as rivets, screws, bolts and similar which allows the reliable application of sealant in a constant and predictable amount and which avoids premature curing of the sealant.

These and other objects which become apparent when reading the following description are solved by a feeder mechanism, a robot effector, and a robot as disclosed herein.

According to the invention a fluid application device for mechanical fasteners, such as rivets, screws, bolts and similar is provided which comprises a fluid application element and a gripping device. The fluid application element comprises a curved application surface, wherein the curved application surface comprises a channel configured to receive a fluid and a brush arranged at the curved application surface and comprising brush elements arranged near the channel, such that the fluid is able to wet the brush elements. The gripping device is configured to push a mechanical fastener against the wetted brush elements and to rotate the mechanical fastener when in contact with the brush elements, such that fluid is transferred to the mechanical fastener.

The curvature of the curved application surface in conjunction with the brush elements allows for a uniform application of fluid to the fastener. As the brush elements are arranged near the channel, the brush elements are constantly supplied with fluid as needed. The channel acts like a reservoir and avoids that the brush elements become dry, such that the right amount of fluid can be transferred to the fastener. At the same time the brush elements time avoid that excess fluid is applied to the fastener by wiping off such excess fluid. In this way, always the right amount of fluid is applied.

The gripping device allows to push the fastener against the brush elements with a predefined force and duration, and to rotate the fastener at a predefined speed. This supports a reliable application of fluid in a constant and predictable amount.

The fluid application device can be placed near an automatic installation mechanism, such that the application of fluid is the last step before installing the fastener in a workpiece. In this way, a premature curing of the fluid can be avoided. Advantageously, the gripping device of the fluid application device can be used to hand the fastener over to the installation mechanism.

Preferably, the brush elements are flexible. Flexible brush elements improve uniform application of fluid and improve wiping off of excess fluid.

Further preferably, the brush elements are bristles or lamellae. Bristles can be manufactured comparably easy, e.g. by extrusion.

Still further preferably, the bristles have such a diameter and distance to each other that fluid is transported by capillary force from the channel to the free ends of the bristles. The capillary force supports a constant supply of fluid to the free ends of the bristles, where the fluid is transferred to the fastener. Thus, a reliable application of fluid in a predefined amount is facilitated. Generally preferred, fluid is transferred through a hose from a storage device to the application surface. The fluid can e.g. be transported and measured by means of a pump, that preferably provides a predetermined amount of fluid to the application surface. Advantageously, the amount of fluid to be transported (pumped) to the application surface is predetermined depending on the kind of fastener to be provided with the fluid. Thus, e.g. in case of larger fasteners more fluid is pumped to the application surface than for smaller fasteners.

Preferably, the curved application surface is essentially semicircular, particularly semicircular. Semicircular surfaces are comparably easy to manufacture, e.g. by milling.

Further preferably, the curvature of the curved application surface is adapted to the diameter of the mechanical fastener. In this way, a uniform application of fluid over the entire circumference of the fastener is facilitated.

Preferably, the fluid application element further comprises a bore leading to the channel to supply fluid to the channel. The bore allows for a constant supply of fluid to the channel.

Preferably, the gripping device is arranged rotatable to move between a first position, where the gripping device grips a mechanical fastener from a feeder mechanism and a second position, where the gripping device pushes the gripped mechanical fastener against the wetted brush elements. Thus, fasteners can be processed, i.e. wetted with fluid, at high frequencies, because the gripping device needs to make a simple rotary motion to move the fastener to the fluid application element. To this end, the gripping device may be mounted on the axis of a motor, e.g. a stepper motor.

Still further preferably, the gripping device is configured to further move to a third position, where the gripping device provides the gripped mechanical fastener to an installation mechanism. In this way, the wetted fasteners can be handed over to the installation mechanism by a simple rotary motion which is advantageous in high-speed applications. As mentioned before, the gripping device may be mounted on the axis of a motor, e.g. a stepper motor.

Preferably, the fluid is a sealant. A sealant may be used in applications where leakage of water or air through rivet holes must be avoided, e.g. in aircraft construction.

The invention is also directed to a robot effector for installing mechanical fasteners, such as rivets, screws, bolts and similar, comprising a frame supporting the described fluid application device.

Preferably, the robot effector further comprises a feeder mechanism supported on the frame for feeding mechanical fasteners, such as rivets, screws, bolts and similar, to the gripping device. Such a feeder mechanism in conjunction with the fluid application device allows for an automatic feeding of wetted mechanical fasteners to an installation mechanism at high speeds and frequencies.

Further preferably, the gripping device is arranged linearly movable on the frame. In this way, the gripping device may pick up a fastener from e.g. an aligning jaw of the feeder mechanism and subsequently push it against the brush of the fluid application element.

The invention is also directed to a robot comprising the described robot effector.

BRIEF DESCRIPTION OF THE DRAWINGS

In the following, the invention is described exemplarily with reference to the enclosed figures, in which.

DETAILED DESCRIPTION

Figure 1:
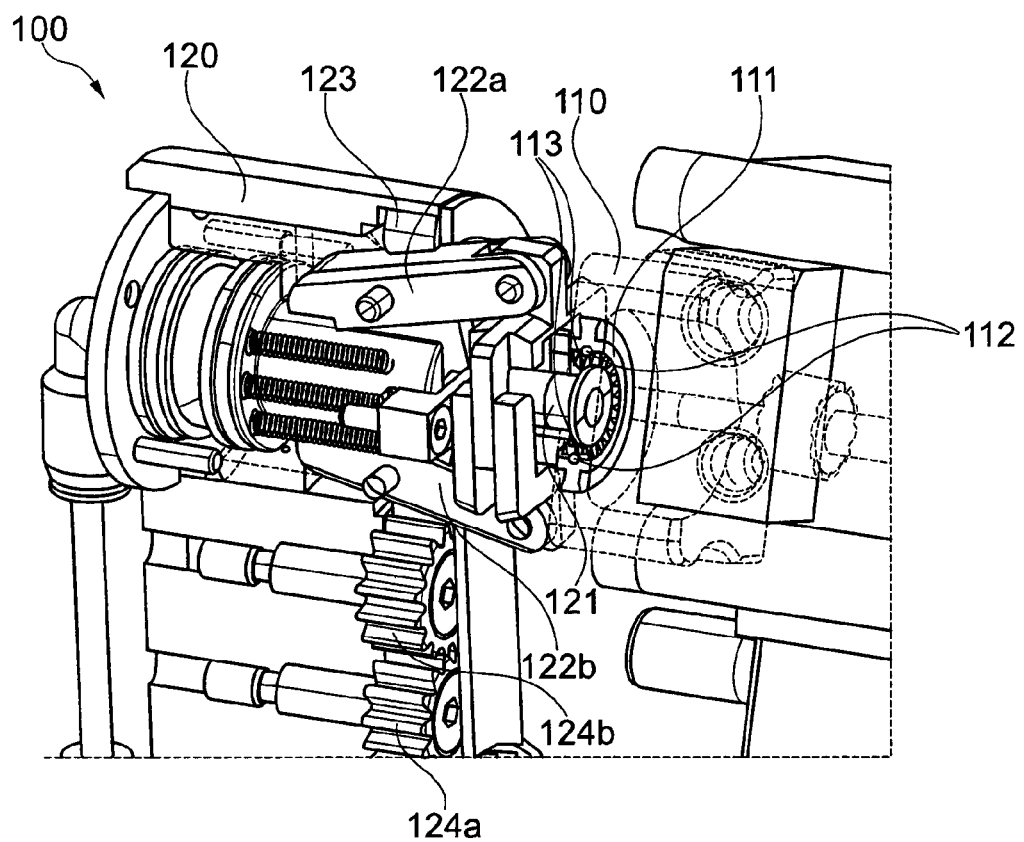
FIG. 1 shows an exemplary embodiment of a fluid application device according to the invention.

FIG. 1 shows an exemplary embodiment of a fluid application device 100 according to the invention. The fluid application device 100 comprises a fluid application element 110. The fluid application element 110 comprises a curved application surface 111. In the exemplary embodiment of FIG. 1 the fluid application surface 111 has a semicircular shape. In general, the fluid application surface 111 may have any curved shape. The fluid application surface 111 comprises a channel 112. In the exemplary embodiment, the channel 112 has the shape of a circumferential notch extending along the circumference of the semicircular fluid application surface 111. In general, the channel 112 may have any desired shape, as long as it is capable of receiving fluid. The fluid may for example be a sealant, glue, or similar.

The fluid application element 110 furthermore comprises a brush 113 arranged at the curved application surface 111. The brush 113 comprises brush elements which in the exemplary embodiments are flexible bristles. The brush elements are arranged near the channel 112, such that fluid is able to wet the brush elements. Wetting of the brush elements may be facilitated for example by capillary forces or gravity.

The fluid application device 100 furthermore comprises a gripping device 120 configured to push a mechanical fastener 121 against the wetted brush elements. To this end, the gripping device of FIG. 1 comprises a pair of jaws 122a, 122b arranged on a holder 123 adapted to grip a mechanical fastener 121. In general, the gripping device 120 may comprise any mechanism to hold a mechanical fastener in place, e.g. may also use a magnetic coil.

The gripping device 120 is also configured to rotate the mechanical fastener 121 when in contact with the brush elements, such that fluid is transferred to the mechanical fastener 121. To this end, the holder 123 of the gripping device 120 in the exemplary embodiment of FIG. 1 is rotatable by gears 124a and 124b which are driven by a motor (not shown in FIG. 1).

The gripping device 120 is arranged rotatable to move between a first position, where the gripping device 120 grips the mechanical fastener 121 from a feeder mechanism or similar (not shown in FIGS. 1 to 3) and a second position, where the gripping device pushes the gripped mechanical fastener 121 against the wetted brush elements. The gripping device 120 is further configured to move to a third position, where the gripping device 120 provides the gripped mechanical fastener 121 to e.g. an installation mechanism (not shown in the Figures). To this end, the gripping device 120 may be mounted on the axis of a motor, e.g. a stepper motor (not shown in FIGS. 1 to 3).

As can be seen in FIG. 1, the curvature of the application surface 111 is adapted to the diameter of the mechanical fastener 121, i.e. the fluid application surface 111 would be essentially concentric with the surface of the mechanical fastener 121 in a cross-sectional view.

Figure 2:
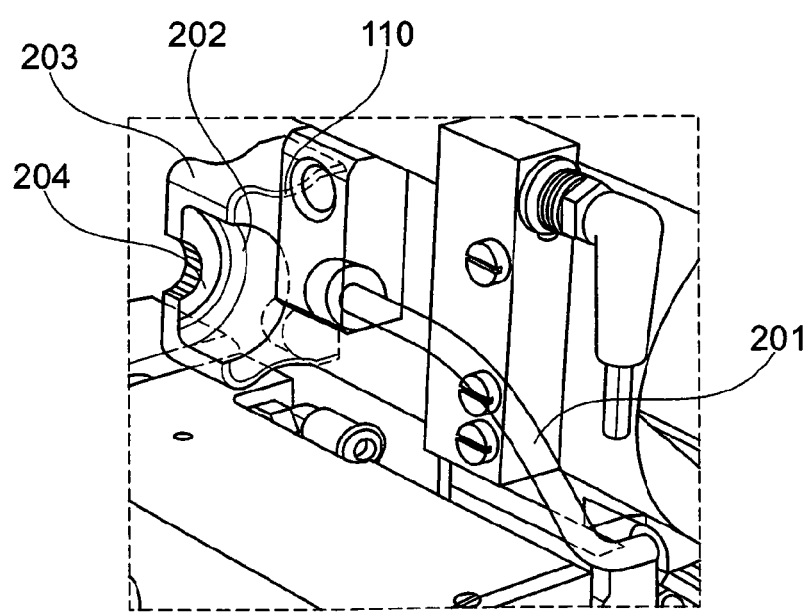
FIG. 2 shows details of a fluid application device of the exemplary embodiment of FIG. 1.
Figure 3:
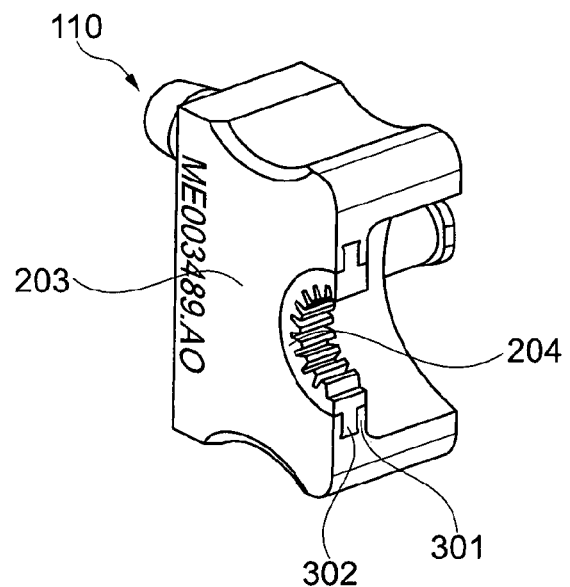
FIG. 3 shows details of a fluid application device of the exemplary embodiment FIG. 1.

The fluid application element 110 is shown in more detail in FIG. 2. As can be seen, a supply element 201 which in the example of FIG. 2 is a hose is connected to the fluid application element supplying the fluid application element 110 with fluid. The hose 201 supplies fluid into a bore 202 formed in the fluid application element 110. The bore 202 in the example of FIG. 2 is curved and leads to the channel 112 to supply fluid to the channel 112.

In the exemplary embodiments the fluid application element 110 comprises two members. The first member 203 comprises the bore 202, whereas the second member 204 comprises the fluid application surface 111 with the brush 113. As can be seen in more detail in FIG. 3, the first member 203 comprises a circumferential groove 301, whereas the second member 204 comprises a complementary circumferential tongue 302. By means of the tongue 302 and the groove 301 the second member 204 may be releasably connected to the first member. As the brush elements are subject to wear due to frequent contact with mechanical fasteners, the second member 204 with the brush 113 may be exchanged during maintenance.

It is also conceivable that the fluid application element 110 is made from one piece instead of several. In this case, the fluid application element 110 can be exchanged as a whole if needed.

Figure 4A:
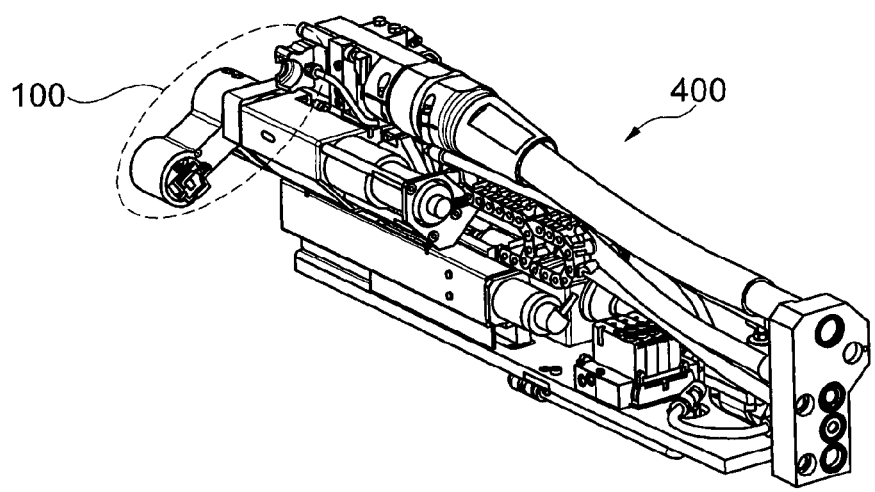
FIG. 4a shows a robot effector with a frame supporting an exemplary embodiment of a fluid application device according to the invention.
Figure 4B:
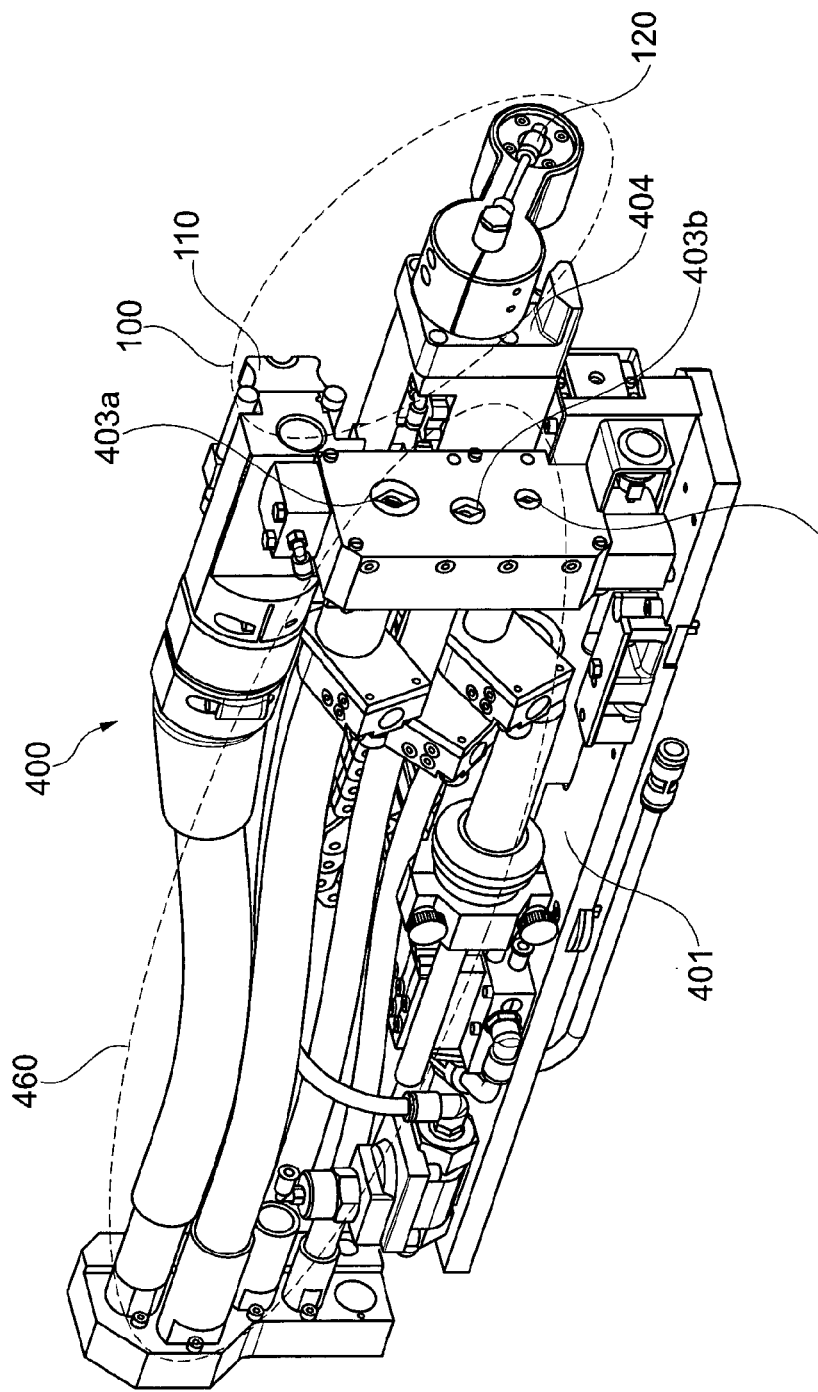
FIG. 4b shows a robot effector with a frame supporting an exemplary embodiment of a fluid application device according to the invention from a different perspective.

FIGS. 4a and 4b show an exemplary fluid application device 100 mounted on a frame 401 of a robot effector 400, i.e. the frame 401 is supporting the fluid application device 100. The robot effector 400 could be part of a robot for automatic installation of mechanical fasteners. Also mounted on the frame 401 is a feeder mechanism 402 for feeding mechanical fasteners to the gripping device 120. During operation, a mechanical fastener is provided by the feeder mechanism 402 in one of its aligning jaws 403a, 403b or 403c. The gripping device 120 may grip the shaft of the fastener, pull the fastener out of the corresponding aligning jaw and transport the fastener to the fluid application device 110 by a rotary motion. To this end, the gripping device 120 is mounted on the axis of a motor 404. In addition, the gripping device is arranged linearly movable on the frame 401. Subsequently, the gripping device 120 may move the wetted fastener by a rotary motion to an installation mechanism (not shown in the Figures) which installs the fastener to a workpiece (not shown in the Figures).

Figure 5:
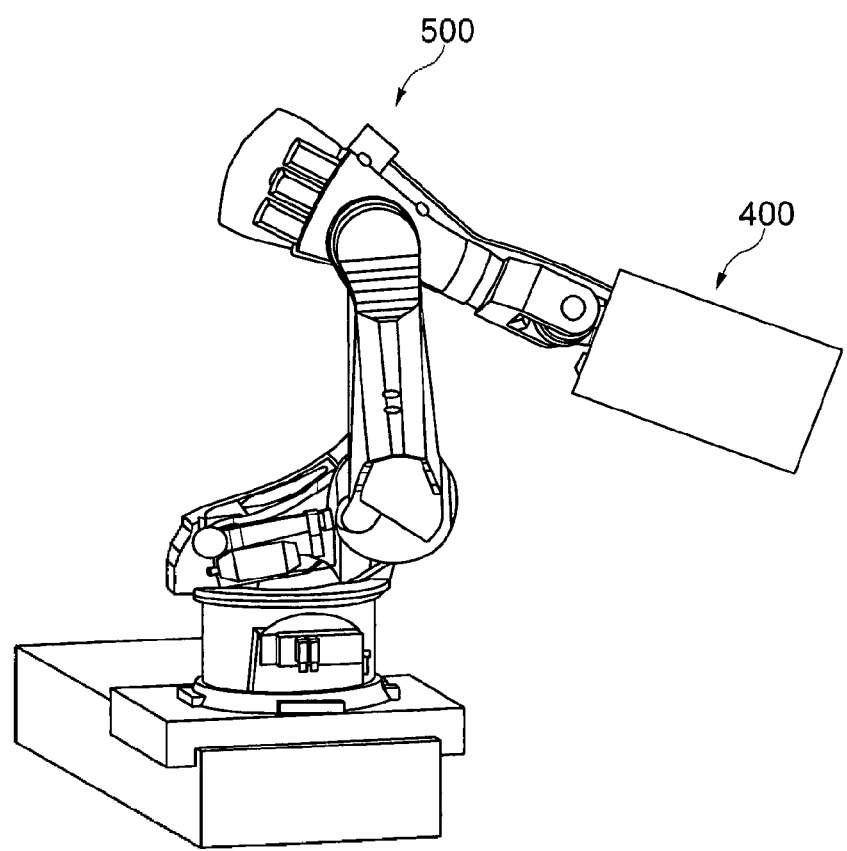
FIG. 5 shows a robot being equipped with an effector.

In FIG. 5, for illustrative purposes, an industrial robot 500 is shown, that is equipped with the effector 400 (the effector 400 is only sketched). The skilled person will realize that the effector 400 can be part of a larger effector that may comprise additional installation means, such as drilling devices, measurement facilities, rivet installation tools etc.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS 100 fluid application device
110 fluid application element
120 gripping device
111 fluid application surface
112 channel
113 brush with brush elements
120 gripping device
121 mechanical fastener
122a and 122b jaws
123 holder
124a and 124b gears
201 hose
202 bore
203 first member
204 second member
301 groove
302 tongue
400 robot effector
401 frame
402 feeder mechanism
403a, 403b and 403c aligning jaws
404 motor
500 robot

What is claimed is:

1. A fluid application device for a mechanical fastener, the fluid application device comprising:
    a fluid application element comprising:
        a first member including a bore and a circumferential groove;
        a second member including an application surface and a complementary circumferential tongue to the circumferential groove such that the second member configured to releasably connect to the first member in the circumferential groove of the first member,
        a channel formed in the application surface and configured to receive a fluid, and
        a brush arranged on the application surface and comprising brush elements arranged near the channel, such that the fluid is able to wet the brush elements providing wetted brush elements;
        said brush is releasably connected to the circumferential groove of the first member of the fluid application element;
    a gripping device comprising a holder and a pair of jaws arranged on the holder adapted to grip the mechanical fastener; the gripping device is mounted is mounted on the axis of a motor;
    the holder is rotatable by gears to rotate the mechanical fastener when in contact with the brush elements;
    a frame supporting the fluid application device,
    the gripping device configured to:
    push the mechanical fastener against the wetted brush elements, and rotate the mechanical fastener when in contact with the brush elements, such that the fluid is transferred to the mechanical fastener.

2. The fluid application device of claim 1, wherein the brush elements are flexible.

3. The fluid application device of claim 1, wherein the brush elements are bristles or lamellae.

4. The fluid application device of claim 3, wherein the bristles have such a diameter and a distance to each other that the fluid is transported by capillary force from the channel to free ends of the bristles.

5. The fluid application device of claim 1, wherein the application surface is substantially semicircular.

6. The fluid application device of claim 1, wherein the application surface is semicircular.

7. The fluid application device of claim 1, wherein a curvature of the application surface is adapted to a diameter of the mechanical fastener.

8. The fluid application device of claim 1, wherein the bore leads to the channel and is configured to supply the fluid to the channel.

9. The fluid application device of claim 1, wherein the gripping device is arranged rotatable to move between a first position, wherein the gripping device grips the mechanical fastener from a feeder mechanism, and a second position, wherein the gripping device pushes a gripped mechanical fastener against the wetted brush elements.

10. The fluid application device of claim 9, wherein the gripping device is configured to further move to a third position, wherein the gripping device provides the gripped mechanical fastener to an installation mechanism.

11. The fluid application device of claim 1, wherein the fluid is a sealant.

12. A robot effector for installing mechanical fasteners, the robot effector comprising the frame supporting the fluid application device of claim 1.

13. The robot effector of claim 12, wherein the effector further comprises a feeder mechanism supported on the frame, the feeder mechanism configured to feed the mechanical fasteners to the gripping device.

14. The robot effector of claim 13, wherein the gripping device is arranged linearly movable on the frame.

15. A robot comprising the robot effector in accordance with claim 12.

* * * * *